US012804540B2

(12) United States Patent
Eleftheriadis et al.

(10) Patent No.: US 12,804,540 B2
(45) Date of Patent: Nov. 17, 2026

(54) RADIO NETWORK NODE AND METHOD PERFORMED THEREIN FOR POWER CONTROL

(71) Applicant: Telefonaktiebolaget LM Ericsson (publ), Stockholm (SE)

(72) Inventors: Lackis Eleftheriadis, Valbo (SE); Athanasios Karapantelakis, Solna (SE); Caner Kilinc, Täby (SE); Rafia Inam, Västerås (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 479 days.

(21) Appl. No.: 18/025,966

(22) PCT Filed: Sep. 16, 2020

(86) PCT No.: PCT/SE2020/050861

§ 371 (c)(1),
(2) Date: Mar. 13, 2023

(87) PCT Pub. No.: WO2022/060259

PCT Pub. Date: Mar. 24, 2022

(65) Prior Publication Data

US 2023/0388922 A1 Nov. 30, 2023

(51) Int. Cl.
*H04W 52/02* (2009.01)
*H04W 52/22* (2009.01)

(52) U.S. Cl.
CPC ..... *H04W 52/0206* (2013.01); *H04W 52/223* (2013.01)

(58) Field of Classification Search
CPC ....... H04L 47/34; H04L 43/026; H04L 43/08; H04L 43/0864; H04L 43/087;
(Continued)

(56) References Cited

U.S. PATENT DOCUMENTS

2012/0270519 A1* 10/2012 Ngai ................... H04W 52/226 455/404.1
2018/0192366 A1* 7/2018 Bontu ................. H04W 52/143
(Continued)

FOREIGN PATENT DOCUMENTS

EP 3667888 A1 * 6/2020 ............... G06F 1/26
WO 2011119079 A1 9/2011
WO 2015047766 A1 4/2015

OTHER PUBLICATIONS

Author Unknown, "Technical Specification Group Radio Access Network; NR; User Equipment (UE) radio transmission and reception; Part 2: Range 2 Standalone (Release 16)," Technical Specification 38.101-2, Version 16.2.0, Dec. 2019, 3GPP Organizational Partners, 157 pages.
(Continued)

*Primary Examiner* — Nathan S Taylor
(74) *Attorney, Agent, or Firm* — Withrow & Terranova, PLLC

(57) ABSTRACT

Embodiments herein disclose e.g. a method performed by a radio network node for controlling power provision of one or more antenna elements associated with a user equipment. The radio network node obtains an indication of a capability relating to an output power of the user equipment; and a state indication of the user equipment indicating an activity level of the user equipment. The radio network node further controls a power arrangement controlling power provision to the one or more antenna elements, based on the state indication and/or the indication of the capability.

16 Claims, 14 Drawing Sheets

(58) Field of Classification Search
CPC ... H04L 43/0876; H04L 47/125; H04L 47/24; H04L 47/41; H04L 69/22; H04L 69/329; H04L 1/1628; H04L 1/1685; H04L 1/188; H04L 1/1883; H04L 2001/0093; H04L 47/19; H04L 47/30; H04L 47/624; H04L 49/9057; H04L 69/16; H04L 69/166; H04L 69/32; H04L 69/321; H04L 69/322; H04L 47/40; H04L 1/00; H04W 28/0263; H04W 28/0268; H04W 28/0289; H04W 72/0453; H04W 76/16; H04W 80/02; H04W 88/06; H04W 24/10; H04W 28/0205; H04W 28/0252; H04W 28/0278; H04W 28/065; H04W 72/0446; H04W 76/11; H04W 8/04; H04W 84/042; H04W 84/12; H04W 88/10; H04W 24/02; H04W 28/02; H04W 72/04; H04W 72/12; H04W 52/0206; H04W 52/223; H04W 52/42; H04W 52/02; H04W 52/22; H04W 52/00; H04W 52/367; H04W 36/38; H04W 52/143; H04W 52/146; H04W 52/226; H04W 52/228; H04W 52/281; H04W 52/283; H04W 52/288; H04W 52/34; H04W 52/343; H04W 52/362; H04W 52/38; H04W 52/40; H04W 52/14; H04W 52/28; H04W 52/36; H04B 17/3913; H04B 7/061; H04B 7/0413; Y02D 30/70; G06F 1/26; G06F 1/324; G06F 1/3243; G06F 1/3296; G06F 30/25; G06F 30/337; G06F 30/392; G06F 1/3234; H02M 1/0012; H02M 1/0025; H02M 3/1584; H02M 1/0009; H02M 1/0048; H02M 1/0058; H02M 1/007; H02M 1/0095; H02M 1/083; H02M 3/00; H02M 3/01; H02M 3/04; H02M 3/07; H02M 3/157; H02M 3/158; H02M 3/1586; H02M 7/23; H02M 1/08; G06N 20/00; G06N 3/006; G06N 3/126; G06N 3/00
USPC .......................................................... 370/329
See application file for complete search history.

(56) References Cited

U.S. PATENT DOCUMENTS

| | | | | |
|---|---|---|---|---|
| 2019/0110256 | A1* | 4/2019 | Immonen | H04L 1/0025 |
| 2020/0266706 | A1* | 8/2020 | Schwabe | G06N 20/00 |
| 2021/0247839 | A1* | 8/2021 | Pathak | G06F 1/324 |
| 2021/0288576 | A1* | 9/2021 | Rizzolatti | H02M 1/007 |
| 2024/0146188 | A1* | 5/2024 | Pilawa-Podgurski | H02M 1/007 |

OTHER PUBLICATIONS

Author Unknown, "Technical Specification Group Radio Access Network; NR; NR and NG-RAN Overall Description; Stage 2 (Release 15)," Technical Specification 38.300, Version 15.2.0, Jun. 2018, 3GPP Organizational Partners, 87 pages.

Author Unknown, "Technical Specification Group Radio Access Network; NR; User Equipment (UE) procedures In Idle mode and RRC Inactive state (Release 15)," Technical Specification 38.304, Version 15.2.0, Dec. 2018, 3GPP Organizational Partners, 28 pages.

Author Unknown, "Technical Specification Group Radio Access Network; NR; User Equipment (UE) procedures in Idle mode and RRC Inactive state (Release 15)," Technical Specification 38.304, Version 15.6.0, Dec. 2019, 3GPP Organizational Partners, 30 pages.

International Search Report and Written Opinion for International Patent Application No. PCT/SE2020/050861, mailed May 11, 2021, 11 pages.

* cited by examiner

RADIO NETWORK NODE AND METHOD PERFORMED THEREIN FOR POWER CONTROL

This application is a 35 U.S.C. § 371 national phase filing of International Application No. PCT/SE2020/050861, filed Sep. 16, 2020, the disclosure of which is incorporated herein by reference in its entirety.

TECHNICAL FIELD

Embodiments herein relate to a radio network node and method performed therein for communication. Furthermore, a computer program product and a computer readable storage medium are also provided herein. In particular, embodiments herein relate to enabling or handling communication of the UE in a wireless communication network.

BACKGROUND

In a typical wireless communication network, user equipments (UE), also known as wireless communication devices, mobile stations, stations (STA) and/or wireless devices, communicate via a Radio Access Network (RAN) to one or more core networks (CN). The RAN covers a geographical area which is divided into service areas or cells, with each service area or cell being served by a radio network node such as a radio access node e.g., a Wi-Fi access point or a radio base station (RBS), which in some networks may also be denoted, for example, a "NodeB" (NB) or "eNodeB" (eNB), "gNodeB" (gNB). A service area or cell is a geographical area where radio coverage is provided by the radio network node. The radio network node communicates over an air interface operating on radio frequencies with the UE within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for UEs. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network and a Fifth Generation (5G) network, have been completed within the 3rd Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. New radio (NR) is a new radio access technology being standardized in 3GPP.

The 5G system (5GS) defined by 3GPP Rel-15 introduces both a new generation radio access network (NG-RAN) and a new core network denoted as 5G core (5GC).

Similar to E-UTRAN, the NG-RAN uses a flat architecture and consists of base stations, called gNBs, which are interconnected with each other by means of the Xn-interface. The gNBs are also connected by means of the NG interface to the 5GC, more specifically to the Access and Mobility Function (AMF) by the NG-Core (C) interface and to the User Plane Function (UPF) by means of the NG-U interface. The gNB in turn supports one or more cells which provides the radio access to the UE. The radio access technology, called new radio (NR), is orthogonal frequency division multiplex (OFDM) based like in LTE and offers high data transfer speeds and low latency.

Future demand for higher traffic needs in LTE and NR will require a larger number of radio units and different radio bands (spectrum). The 5G/NR standard 3GPP TS 38.304 v15.2.0 enables power savings on the UE side, using the 3 states on which a UE is dynamically adapted between [1]. The 3 radio resource control (RRC) states are following:

1: RRC_ACTIVE or (RRC_Connected)
2: RRC_IDLE
3: RRC_INACTIVE

The first two states are similar to as in LTE, while RRC_INACTIVE is new in 5G NR. A UE needs more time to transition from RRC_Idle to RRC_Connected state, in comparison with required time to transition from RRC_INACTIVE to RRC_Connected state. Thus, the advantage for introducing the new state (RRC_INACTIVE) is to reduce the signaling load and the latency in the control plane and for transitioning faster into RRC_Connected state because in RRC_INACTIVE state the RRC context and core network connection keep being established which is not the case in RRC_IDLE.

In order to operate the networks more efficiently, by taking into account some information e.g. UE location within the cells and the traffic characteristics, the gNB steers the UEs in order to

- perform the Cell Selection and Re-selection,
- to adapt based on the RRC_IDLE and RRC_INACTIVE and putting the UE into different sleep mode states.

Another standard also defines the UE's maximum radio frequency (RF) output power, to be able to more efficiently control power in the RAN network and on the UE side. For New Radio (NR) in 5G, four power classes are defined, see section 6 of [2]. Each power class represents a different type of UE, e.g. fixed wireless access UE, vehicular UE, handheld UE, non-handheld high-power UE.

The different maximum power class enables the UE to be operated within the power classes.

In NR, massive Multiple-Input, Multiple-Output (MIMO) is a wireless technology that uses multiple transmitters and receivers in a minimum 16×16 array to increase data capacity. It is at present provided a New Radio (NR)-capable radio designed for compatibility with the 5G NR standard that also supports LTE. It may feature 64 transmit and 64 receive antennas enabling it to support 5G plug-ins for both Massive MIMO and Multi-User MIMO.

SUMMARY

As part of developing embodiments herein a problem has been identified. The problem that is not defined in the standards for NR MIMO, is the attenuation of power level of the radio unit itself in response to the UE power status. Specifically, while the UEs, dynamically attenuate their RF power within their designated maximum power level, and across the RRC states, the radio unit hardware (HW) itself is not adapting to these changes.

To enable a more efficient operation also in the radio unit itself, a new method is herein introduced, that enables power scaling also for radio unit, in relation to the different UE RRC states and UE power classes.

Current generation of macro radio sites and high-power radio units have Power Amplifiers (PA) with power saving features and the ability to turn ON/OFF, bias control, and voltage adjustment. In addition, other features such as carrier aggregation and antenna muting exist to save power on the radio unit, as for 2Tx/2Rx, or 4Tx/4Rx.

For the new radio NR and small cells, the functionality and power architecture are different. Future NR radio units will consume more power, and will require a new power architecture, as example one smaller Point-of-Load (POL) converter for one transmitter (TX). A POL converter is a voltage regulator that converts the voltage coming from the main direct current (DC)/DC power supply to smaller, regulated voltages needed to power one antenna or a sub-array of antennas in e.g. a MIMO.

The decisions for the radio unit, to transmit and which power saving to be on, is currently controlled and based on what the scheduler function inside the Base band (BB) allocating for radio traffic. Currently, both BB and radio unit lack control, based on information of the UE different states and UE power classes, to enable more power savings on the radio unit itself, on the DC/DC and on the POL converters.

An object of embodiments herein is to provide a mechanism for improving energy efficiency of a wireless communication network e.g. using antenna elements efficiently in the wireless communication network.

According to an aspect the object is achieved by providing a method performed by a radio network node for controlling or managing power provision of one or more antenna elements associated with a UE in a wireless communication network. The radio network node obtains, e.g. receives capability indication from the UE, retrieves it from within the radio network node or is being configured to obtain an indication of a capability relating to an output power of the UE. The radio network node obtains a state indication, e.g. determines based on message sent to/received from UE, of the UE indicating an activity level of the UE. The radio network node controls a power arrangement controlling power provision to the one or more antenna elements, based on the state indication and/or the indication of the capability.

According to yet another aspect the object is achieved by providing a radio network node for controlling power provision of one or more antenna elements associated with a UE, wherein the radio network node comprises processing circuitry and a memory, said memory comprising instructions executable by said processing circuitry whereby said radio network node is configured to obtain an indication of a capability relating to an output power of the user equipment. The radio network node is further configured to obtain a state indication of the UE indicating an activity level of the UE. The radio network node is configured to control a power arrangement controlling power provision to the one or more antenna elements, based on the state indication and/or the indication of the capability.

It is furthermore provided herein a computer program product comprising instructions, which, when executed on at least one processor, cause the at least one processor to carry out any of the methods above, as performed by the radio network node. It is additionally provided herein a computer-readable storage medium, having stored thereon a computer program product comprising instructions which, when executed on at least one processor, cause the at least one processor to carry out the method according to any of the methods above, as performed by the radio network node.

The method uses the different state conditions such as RRC Connected, idle and inactive, alone or together with power capabilities of UEs such as UE power class, to determine and control a power. This is efficient since the power requirements may be known in advance on the radio network node such as a base band scheduler and/or radio unit and a corresponding UE power class. The radio network node may furthermore scale and propose a control arrangement to the power arrangement, via e.g. the BB and radio unit.

Embodiments herein enable a faster approach for power saving in the wireless communication network, with a radio unit comprising multiple antenna elements also denoted as transmission points (TP) of an antenna, e.g. set the maximum power or a maximum power clipping power of a voltage regulator feeding one or more antenna elements. This further leads to an energy efficient performance of the wireless communication network.

BRIEF DESCRIPTION OF THE DRAWINGS

Embodiments will now be described in more detail in relation to the enclosed drawings, in which.

DETAILED DESCRIPTION

Embodiments herein are described within the context of 3GPP NR radio technology (3GPP TS 38.300 V15.2.0

(2018-06)). It is understood, that the embodiments herein are equally applicable to wireless access networks and UEs implementing other access technologies and standards. NR is used as an example technology in the embodiments herein, and using NR in the description therefore is particularly useful for understanding the problem and solutions solving the problem. In particular, the embodiments herein are applicable also to 3GPP LTE, or 3GPP LTE and NR integration, also denoted as non-standalone NR.

Figure 1:
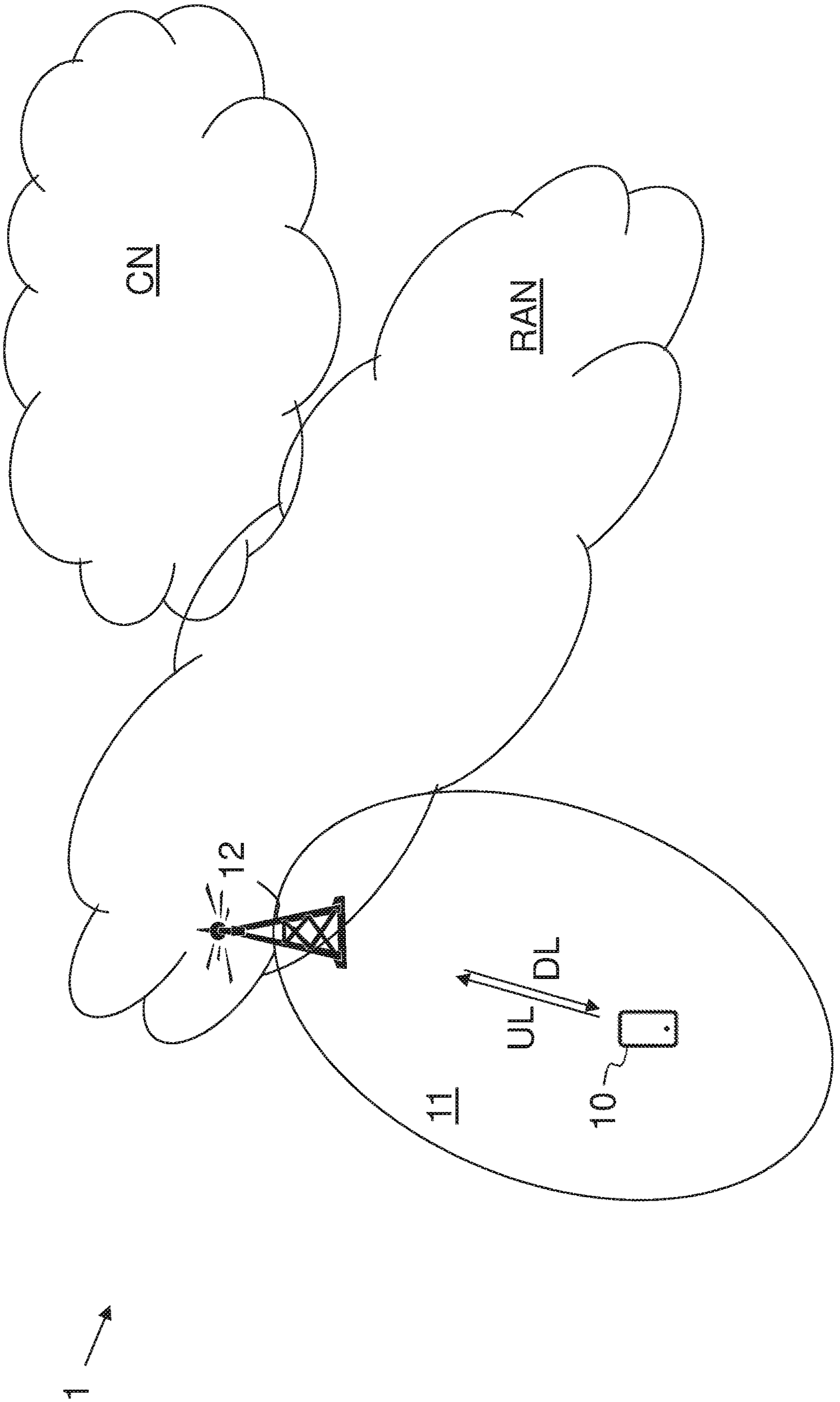
FIG. 1 shows a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs e.g. a first RAN (RAN1), connected to one or more CNs. The wireless communication network 1 may use one or more technologies, such as Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, wireless devices e.g. a UE 10 such as a mobile station, a non-access point (non-AP) station (STA), a STA, a UE and/or a wireless terminal, are connected via the one or more RANs, to the one or more CNs. It should be understood by those skilled in the art that "UE" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area.

The wireless communication network 1 comprises a radio network node 12. The radio network node 12 is exemplified herein as a first radio network node or a first RAN node providing radio coverage over a geographical area, a first service area 11, of a first radio access technology (RAT), such as NR, LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, a gNodeB, an evolved Node B (eNB, eNodeB), a base transceiver station, Access Point Base Station, base station router, a transmission arrangement of a radio base station, a stand-alone access point or any other network unit capable of serving a UE 10 within the service area served by the radio network node 12 depending e.g. on the radio access technology and terminology used and may be denoted as a primary radio network node. The radio network node 12 may alternatively be denoted as a serving radio network node providing a primary cell for the UE 10.

It should be noted that a service area may be denoted as cell, beam, beam group or similar to define an area of radio coverage.

According to embodiments herein the radio network node 12 obtains an indication of a capability relating to an output power of the UE 10 and obtains a state indication of the UE indicating an activity level of the UE. The radio network node 12 then controls a power arrangement controlling power provision to a one or more antenna elements, i.e. transmission points such as subarrays of an antenna, based on the state indication and/or the indication of the capability.

Thus, embodiments presented herein are provided to enable power saving also in a RAT such as the new NR radio, based on e.g. the RRC state, such as UE active, inactive, and idle states, and/or capability relating to an output power such as UE power class. To optimize the usage of network resources and to minimize the usage of UE energy, embodiments herein propose that by using e.g. Machine learning (ML) model, to control e.g. power clipping of voltage converters, energy savings can be achieved. Thus, one may use a ML model to optimize the power to one or more transmission points of the antenna also. Embodiments herein avoid unnecessary power cycle inside e.g. an POL converter and enables energy storage of capacitors located on power circuit board (PCB) brunches to feed the radio network node or radio unit such as antenna elements.

Figure 2:
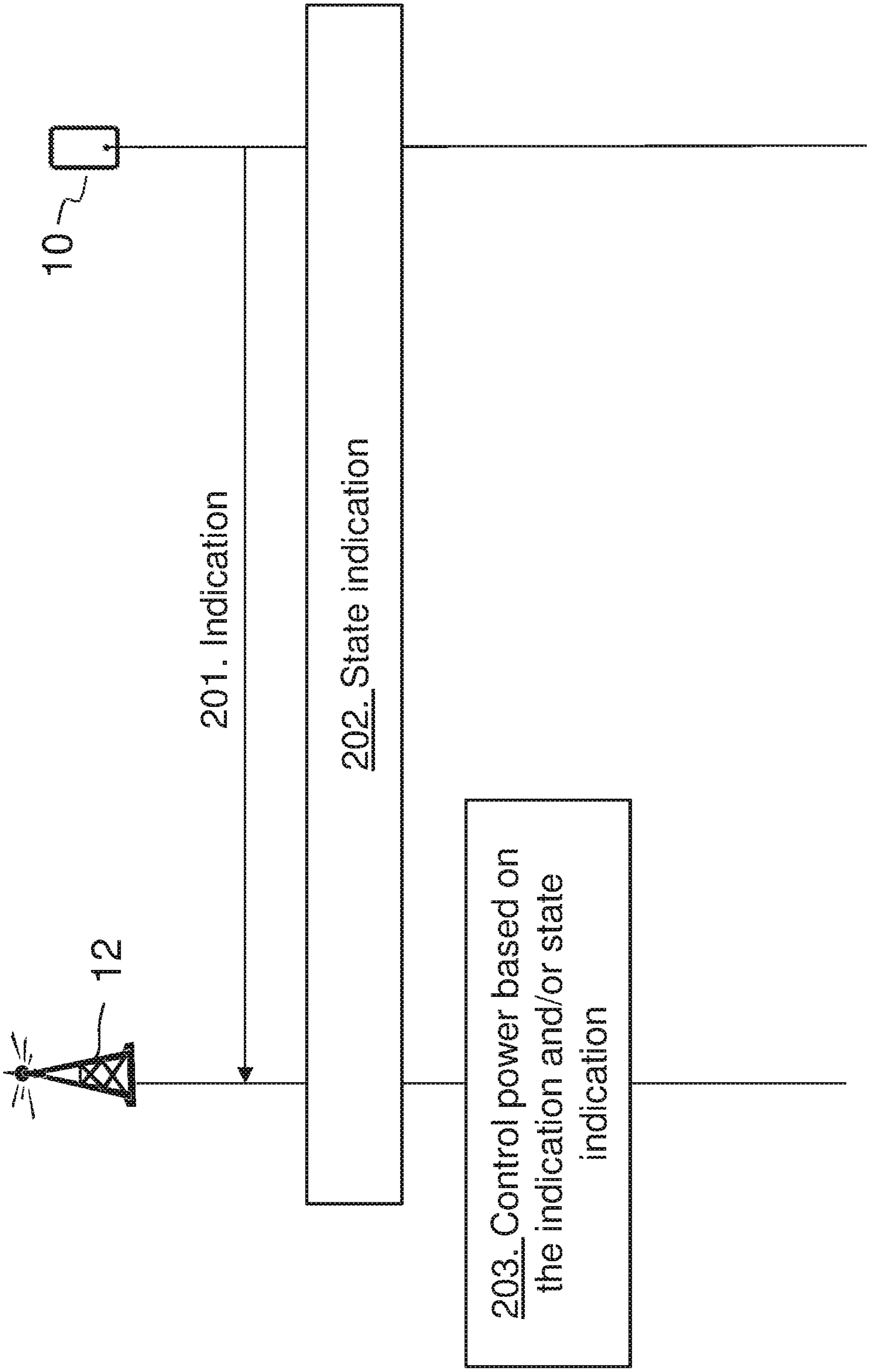
FIG. 2 shows a schematic combined signaling scheme and flowchart depicting some embodiments herein.

FIG. 2 is a schematic combined signaling scheme and flowchart depicting embodiments herein.

Action 201. The radio network node 12 may obtain the indication of the capability of the UE such as power class capabilities of UEs. E.g. power class reported from the UE or received from another network node.

Action 202. The radio network node 12 may obtain e.g. determine state indication of the UE e.g. via RRC state messages sent or received from the UE.

Action 203. The radio network node 12 then controls the power arrangement such as a POL converter controlling power provision to one or more antenna elements, based on the state indication and/or the indication of power capability. E.g. the radio network node may perform smart array resource loading by transmitting commands to one or more POL converters to switch on or off power of respective POL converter based on power class and/or RRC state to the UE 10.

The general idea is to enable a power saving function and method to radio units of, or connected to, the radio network node 12, in order to control e.g. POL converters by using a power clipping arrangement, in direct relation to e.g. variable multiple UE's states conditions and/or multiple UE's power classes in a specific cell. Based on that power levels that are set for e.g. three different RRC states, and the UE specific power classes, the POL converter in one array may controlled e.g. be turned OFF— meaning that the particular array will not be used for transmission or reception of data to/from a UE.

Figure 3A:
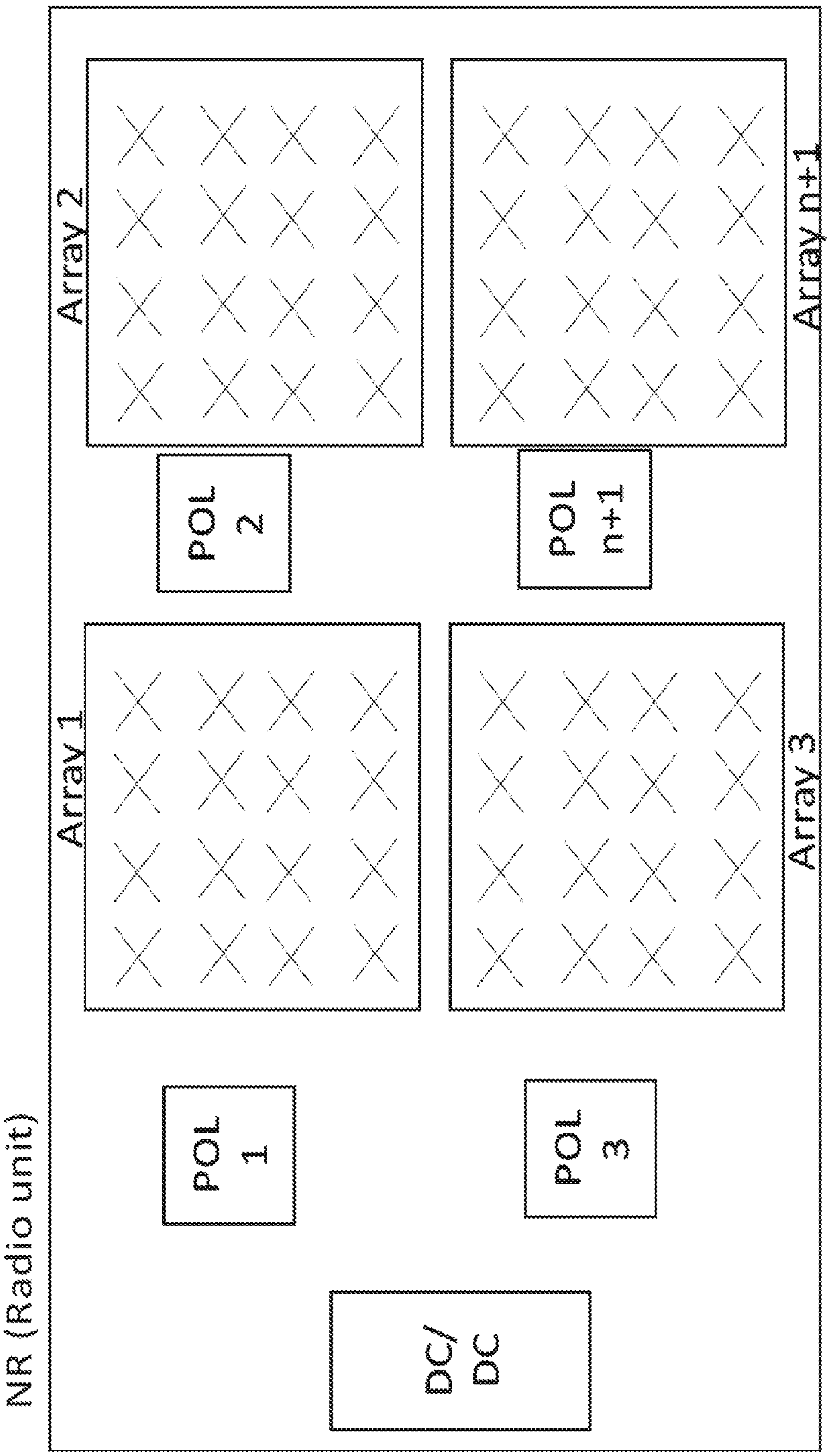
FIG. 3 shows different configurations of POL converters providing power to one or more antenna elements.
Figure 3B:
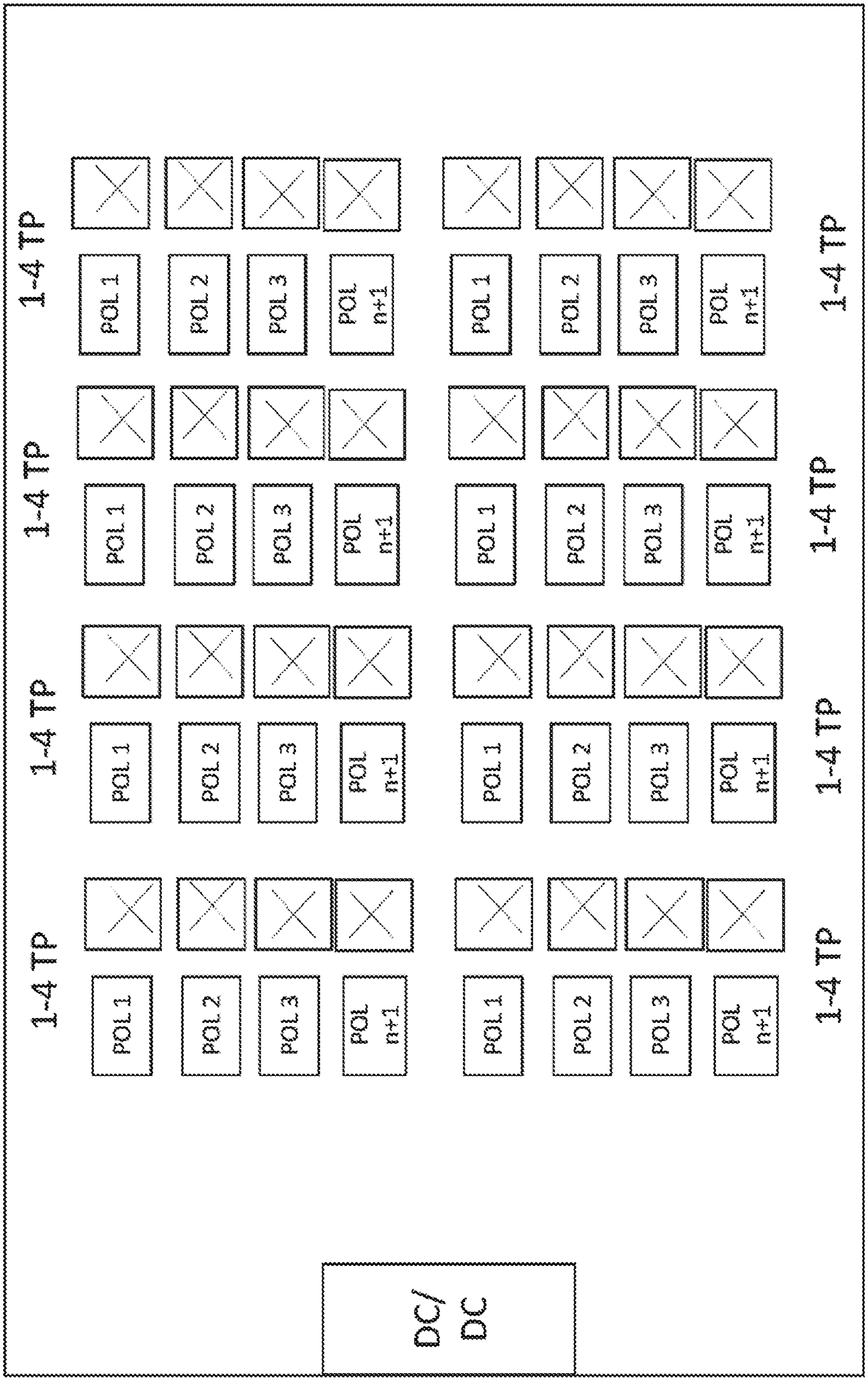

The value of embodiments herein may increase further when NR units with multiple antenna ports will have even more power converters and smaller POL converters will be located close to the antenna ports see FIGS. 3*a*-3*b*. A POL converter may be very small but need to be controlled in a fast and predefined controlled way to enable power savings, based on traffic. In the proposed future radio power architecture for NR, one POL converter may be matched with one TX output.

By using the information of the indication and the state indication e.g. UE different states and UE power class, and to e.g. send status information of power to a POL converter, the POL converter can enable to use power clipping to enable power saving. In FIGS. 3*a* and 3*b*, a typical architecture example can be seen 1:16 relation. Other examples of architecture and relation as 1:1 or 1:4, 1:8 etc. depending on the total radio power unit that are developed. In one embodiment, the operation and RF output power of the UE's in different locations in one cell/cells are synthesized in relation to the different UE active and inactive/idle states.

In one embodiment the UE maximum RF output power is categorized in relation to the Radio unit in gNB to allow power savings in the radio unit.

In another embodiment, an ML method may be used to define and predict the different future UE states and power classes located in each cell, to foresee a more predictable control approach for the POL converter power clipping. For instance, the power saving mechanism can be also built based on unsupervised cluster tags which are identified by using the ML models also referred to as artificial intelligence models. Furthermore, for the unsupervised clustering models any relevant end-to-end information can be used as the input such as location of UEs, transmission nodes, radio parameters and more to the ML model and cluster tags may be the output of the unsupervised ML model. The cluster tags may indicate state such as whether the UE is active or inactive or even some sort of semi-inactive semi-idle status may be identified. Based on the identified RRC state of the UE 10 the proposed function will perform smart array resource triggering and thereby optimizing the consumed energy.

In another embodiment, the power information for each antenna element that is to be used, is sent to the POL converter that power feeds the antenna element, to be able to enable a power clipping, by setting the maximum limit of use of the POL converter. By sending the exact amount of power to be used in the small antenna element, unnecessary power cycle internally may be avoided and instead the energy in the capacitors may be stored in itself, wherein the capacitors are located on the PCB brunches.

In another embodiment, the received information in for the UE power to be used, enables a calculation of the output capacitor reservoir on the POL converter, that enables or disables a power cycle of the POL converter.

Figure 4:
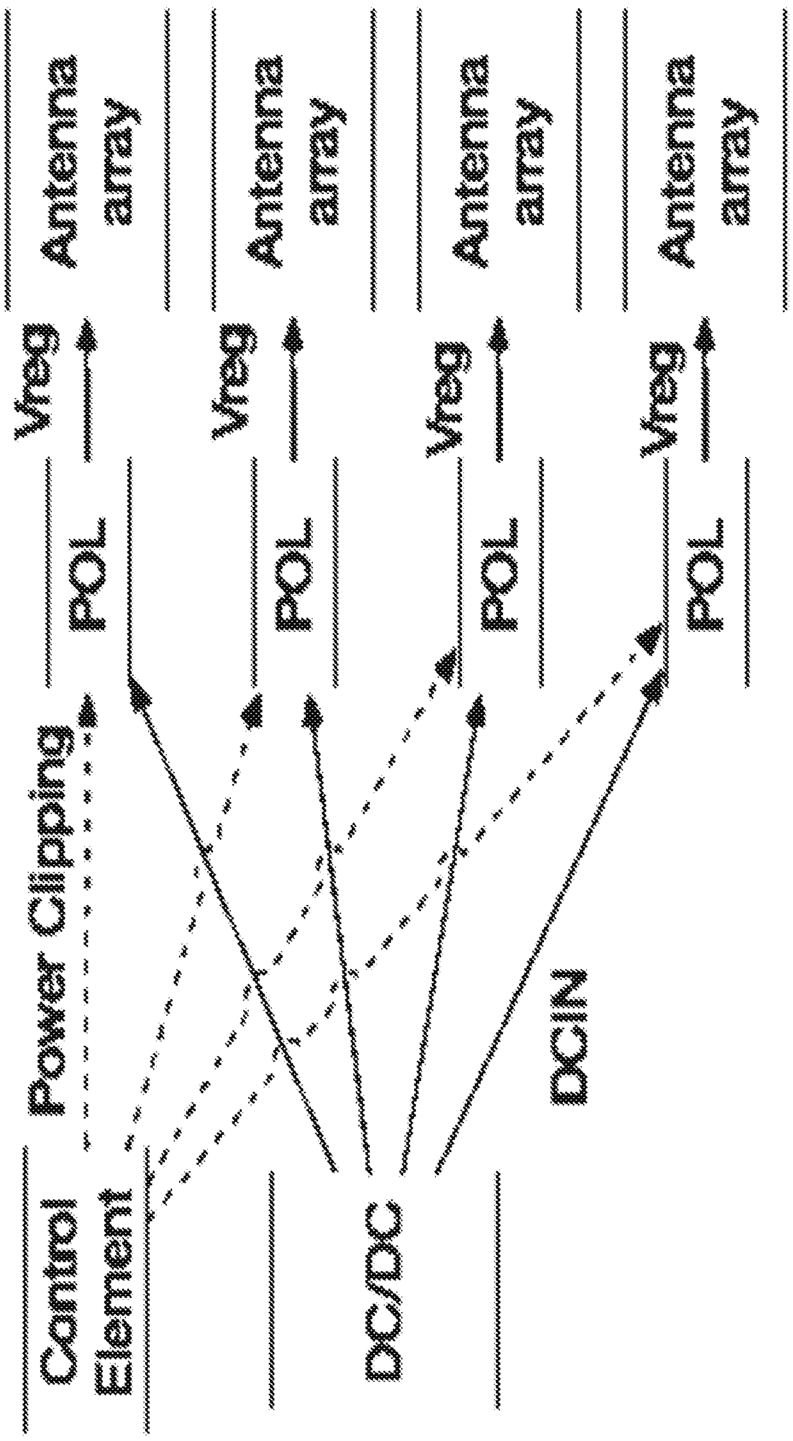
FIG. 4 is a block diagram depicting a solution according to embodiments herein.

It is herein assumed that there exists at least one antenna array, with at least one or more antenna elements, and at least one power arrangement such as a POL converter connected to that array see FIG. 4.

A new component associated with the POL converter is a control element, a logical node that attenuates current (power clipping) for every POL, using as input data UE state and power class of the UE 10. The control element is a logical component and may be part of an RU, BB or antenna, or be distributed among those. For example, the part of the control element probing or obtaining for the state indication may reside in the BB, whereas the part which makes power control decisions and initiates or actuates those decisions on the POLs may reside in the radio unit and/or antenna.

Figure 5:
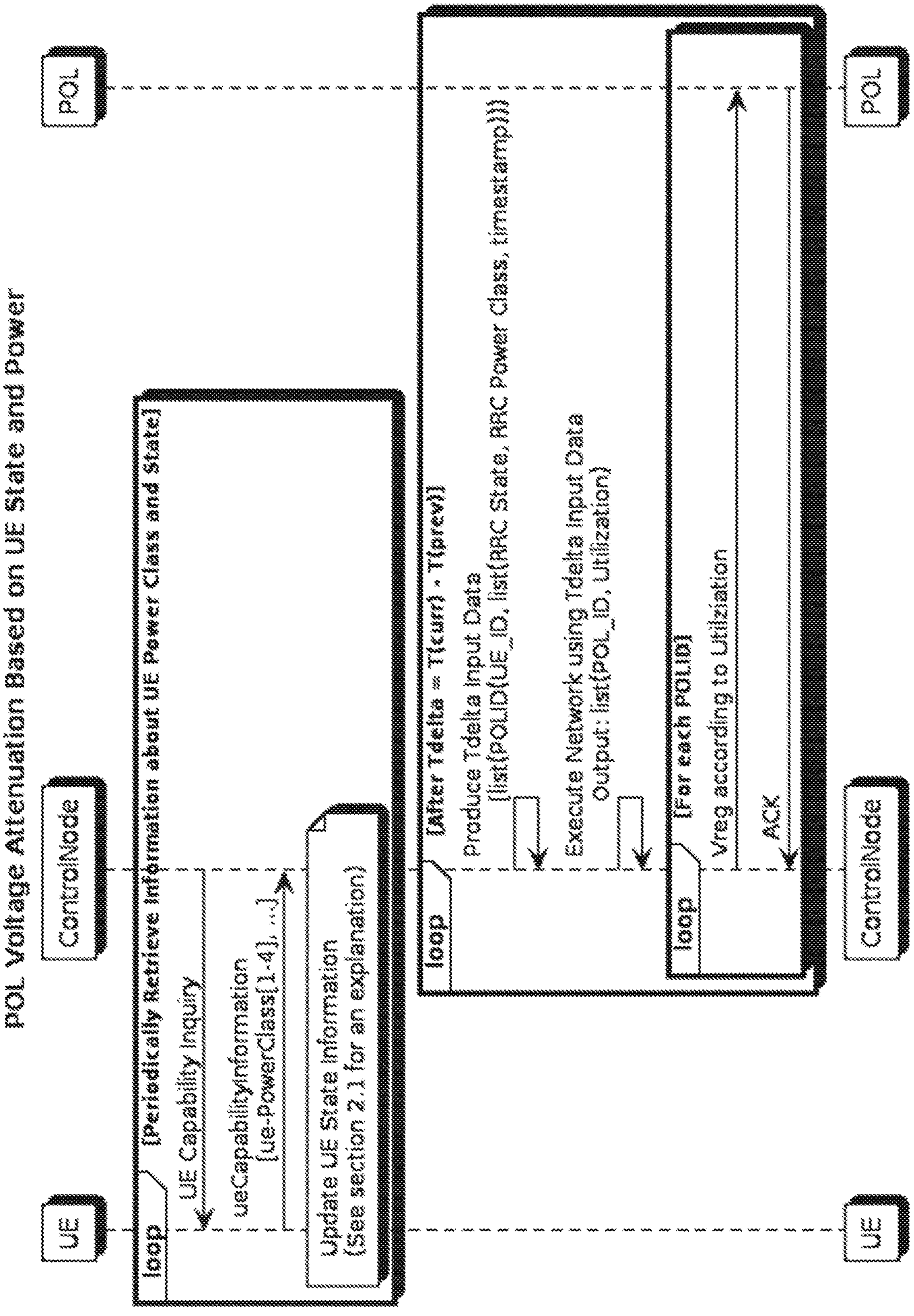
FIG. 5 is a POL voltage attenuation method according to embodiments herein.

An example is illustrated in a sequence diagram shown in FIG. 5. It should be noted that while it is possible for the network to directly enquire for the UE power class using UE Capability Enquiry RRC message, the RRC state may be indirectly retrieved via transmission of messages such as

- RRCResume from UE to Control Node (RRC_INACTIVE to RRC_CONNECTED state)
- RRCRelease (using suspendConfig) from Control Node to UE from RRC_CONNECTED to RRC_INACTIVE state)
- RRCRelease (without using suspendConfig) from Control Node to UE from RRC_INACTIVE to RRC_IDLE state)

More information can be found at [3]. As there can be many scenarios for state transitions that are impractical to fit to the sequence diagram, we put a note of UE state update on it and resort to the explanation above with regards to how the network can identify certain UE states at any given time.

It should be noted that what FIG. 5 illustrates is a scenario where a machine learning method is used for predicting the state of POL converter for the next X number of steps. It is a non-limiting case, and it is also possible that a simpler rule-based approach can be used as well.

Thus, one may outline a non-limiting ML method which can be used in order to predict future power class and state of UEs, that can later be used for power clipping at the POL converter. It should be noted that depending on the architecture, a POL converted can feed an array matrix controlling more than one UEs, or a single antenna (in case of future NR/AIR products), which controls a single UE—the description disclosed here can accommodate any of these cases.

Specifically, a sequence to sequence Long Short-Term Memory (LSTM) recurrent neural network (RN N) may be a suitable configuration for this case. The reason for using LSTMs is twofold:

- First, our dataset is a time series, meaning that input to the network is sequential rather than simultaneous/concurrent. The Latter for example is typical input for feed-forward convolutional neural network (CNNS) and classical regression problems, but unfit for data that exhibits seasonality and time-dependence.
- Second, the choice of LSTM over "vanilla" RRNS is due to the fact that the latter suffer from memory loss (especially long-term memory loss)—so longer-lasting patterns (sequential dependencies of data) will be harder capture with a vanilla RNN. Appendix A gives a brief introduction of vanilla RNN and LSTM.

Figure 6B:
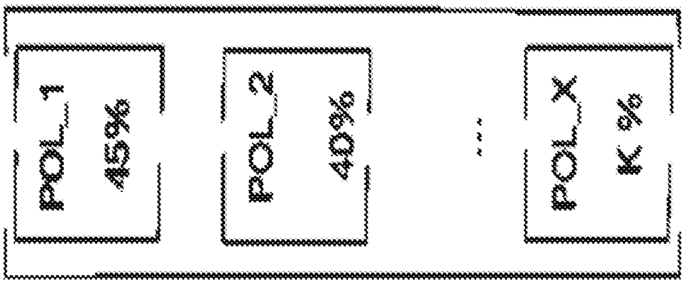
FIG. 6 shows inputs and outputs from a ML model according to some embodiments herein.
Figure 6A:
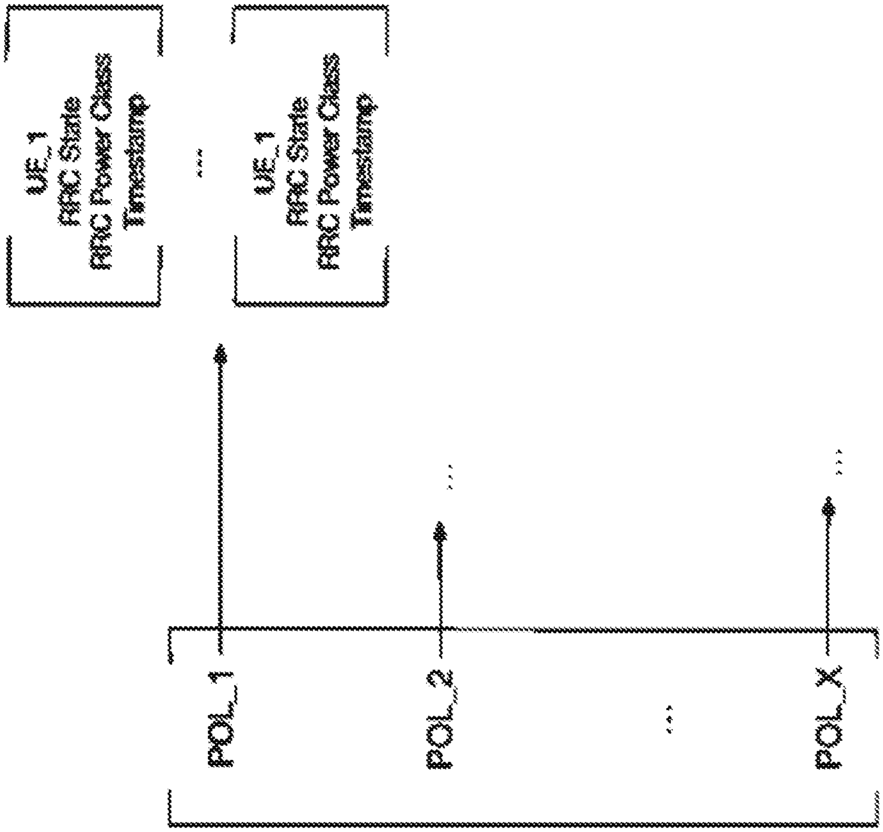

In our case, we consider that we have an LST with input a 3-dimensional vector, as shown in FIG. 6*a*, while the output is a 2-dimensional vector shown in FIG. 6*b*.

Specifically, the input of the model is a list of lists of features of timestamped UE data, identifier, state and class of the UE, for every POL in the configuration see FIG. 6*a*. The output of the model is a maximum utilization rating, e.g. in percentage, for every POL, FIG. 6*b*. The model is executed every X amount of time (e.g. 5 minutes). The percentage, is an indication of load of the antenna elements fed from POL converter. It give as an indication which POL converter to switch OFF.

Figure 7:
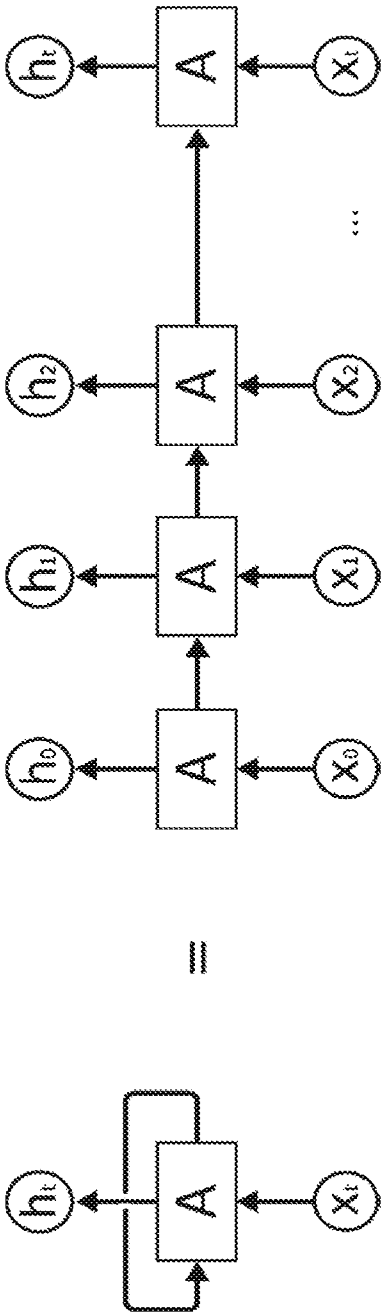
FIG. 7 shows an example of a neural network that may be used in some embodiments herein.

Embodiments herein may be used for doing forecasting is Recurrent Neural Networks (RNNs). Such networks are feed-forward in nature but have a temporal dimension to them. A typical representation of an RNN is illustrated in FIG. 7. The RNN consists of an activation layer A, with a set of weights. Given an input X, it uses the weights and activation functions to produce an output h. In every time step weights from previous state pass to the current state, and that's a way for the neural network to keep in memory previous information.

RNNs suffer from memory issues, meaning that for patterns exhibited over larger amounts of time and data, special RNNs such as Long short term memory (LSTM) can be used—these have special operations in the activation layer to decide what to add to the weights of every state rather than simply copying the weights. In this way, LSTMs can learn dependencies in the longer term.

PlantUML Source for Sequence Diagram

```
@startuml
participant UE
participant ControlNode
participant POL
```

-continued

PlantUML Source for Sequence Diagram

```
title POL Voltage Attenuation Based on UE State and Power
loop Periodically Retrieve Information about UE Power Class and
State
ControlNode->UE: UE Capability Inquiry
UE->ControlNode: ueCapabilityInformation\n\t[ue-
PowerClass[1-4], ...]
note over UE, ControlNode: Update UE State Information\n(See
section 2.1 for an explanation)
end
loop After Tdelta = T(curr) - T(prev)
ControlNode->ControlNode: Produce Tdelta Input
Data\n\t[list(POLID(UE_ID, list(RRC State, RRC Power Class,
timestamp)))
ControlNode->ControlNode:Execute Network using Tdelta Input
Data\n\tOutput: list(POL_ID, Utilization)
loop For each POLID
ControlNode->POL: Vreg according to Utilziation
POL->ControlNode:ACK
end
end
@enduml
```

Figure 8:
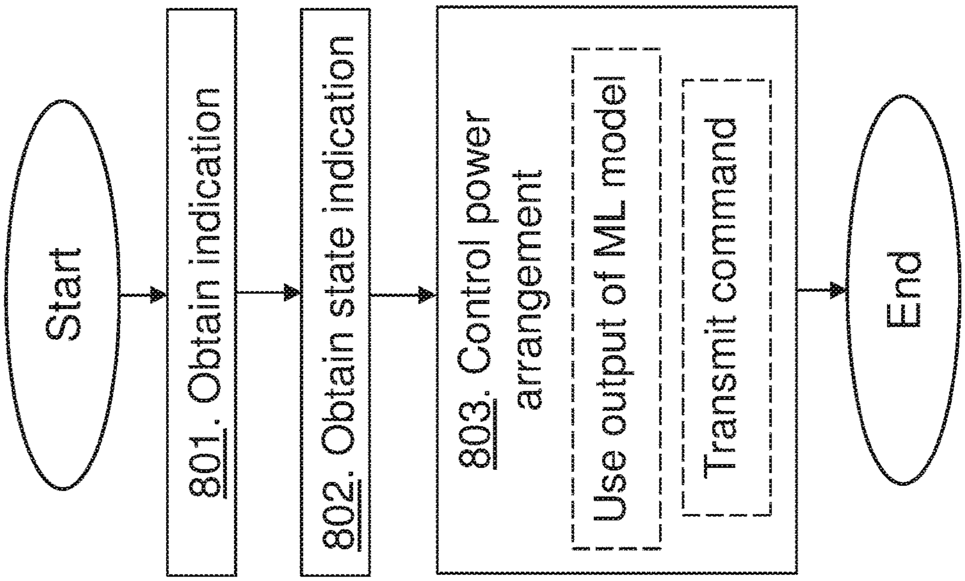
FIG. 8 is a flowchart depicting a method performed by a radio network node according to embodiments herein.

The method actions performed by the radio network node 12 for controlling/managing power provision of one or more antenna elements associated with the UE 10 in the wireless communication network according to embodiments will now be described with reference to a flowchart depicted in FIG. 8. The actions do not have to be taken in the order stated below, but may be taken in any suitable order. Actions performed in some embodiments are marked with dashed boxes.

Action 801. The radio network node 12 obtains the indication of the capability relating to an output power of the UE 10. E.g. the radio network node 12 may receive capability indication from UE; retrieve it from within the radio network node or be configured with it. The capability relating to an output power of the UE 10 may comprise power mode, power class, level of output power, and/or pattern of output power, of the UE.

Action 802. The radio network node 12 obtains the state indication of the UE 10 indicating the activity level of the UE. E.g. the radio network node 12 may receive or transmit messages from or for the UE and based on these messages determine state indication of the UE 10.

Action 803. The radio network node 12 further controls the power arrangement controlling power provision to the one or more antenna elements, based on the state indication and/or the indication of the capability. E.g. the radio network node 12 may control the power arrangement by selectively activating and/or deactivating the one or more antenna elements based on the state indication and/or the indication. E.g. the radio network node 12 may control the power arrangement by transmitting a command to one or more voltage regulators to switch on or off power of respective voltage regulator based on the state indication and/or the indication. Additionally or alternatively, the radio network node 12 may control the power arrangement by using an output of a ML model to control the power arrangement. One or more input parameters of the ML model may comprise one or more of the following: current state indication; current indication of capability; previous state indication; current indication of capability; location of UEs; time of day; and radio parameters. The power arrangement may comprise a voltage regulator e.g. a point of load converter, an amplifier or similar. The radio network node 12 may comprise the power arrangement or may be connected to the power arrangement.

Figure 9:
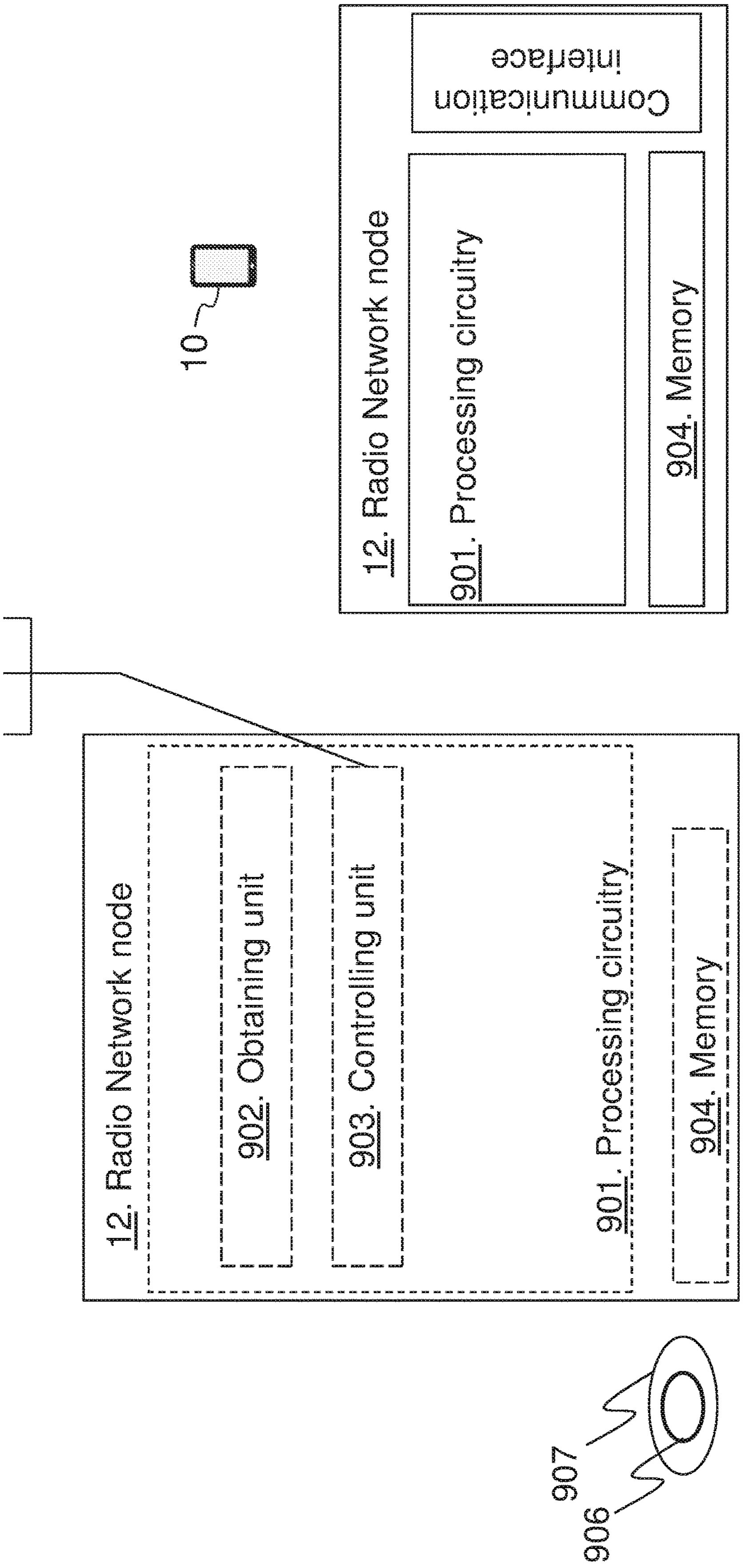
FIG. 9 is a block diagram depicting a radio network node according to embodiments herein.

FIG. 9 is a block diagram depicting the radio network node 12 for controlling power provision of one or more antenna elements associated to a user equipment according to embodiments herein. The radio network node may comprise the power arrangement or may be connected to the power arrangement.

The radio network node 12 such as a radio base station may comprise processing circuitry 901, e.g. one or more processors, configured to perform the methods herein. Thus, the radio network node 12 comprises processing circuitry and a memory, said memory comprising instructions executable by said processing circuitry whereby said radio network node is configured to perform the methods herein—

The radio network node 12 may comprise an obtaining unit 902, e.g. a receiver or transceiver. The radio network node 12, the processing circuitry 901 and/or the obtaining unit 902 is configured to obtain the indication of the capability relating to the output power of the user equipment; and the state indication of the user equipment indicating an activity level of the user equipment. The radio network node may be configured to receive indication of the capability of power classes and also the state indication. The capability relating to an output power of the user equipment may comprise power mode, power class, level of output power, and/or pattern of output power, of the user equipment.

The radio network node 12 may comprise a controlling unit 903, e.g. a transmitter or transceiver. The radio network node 12, the processing circuitry 901 and/or the controlling unit 903 is configured control the power arrangement controlling power provision to the one or more antenna elements, based on the state indication and/or the indication of the capability. The radio network node 12, the processing circuitry 901 and/or the controlling unit 903 may be configured control the power arrangement by selectively activating and/or deactivating the one or more antenna elements; and/or by transmitting the command to one or more voltage regulators to switch on or off power of respective voltage regulator. The radio network node 12, the processing circuitry 901 and/or the controlling unit 903 may be configured control the power arrangement by using the output of the ML model to control the power arrangement. One or more input parameters of the ML model may comprise one or more of the following: current state indication; current indication of capability; previous state indication; current indication of capability; location of user equipments; time of day; and radio parameters. The power arrangement may comprise a voltage regulator. The voltage regulator may comprise a point of load converter, an amplifier or similar.

The radio network node 12 further comprises a memory 904. The memory comprises one or more units to be used to store data on, such as indications, type of data traffic, applications to perform the methods disclosed herein when being executed, and similar. Thus, the radio network node 12 may comprise the processing circuitry and the memory, said memory comprising instructions executable by said processing circuitry whereby said radio network node is operative to perform the methods herein. The radio network node 12 may comprise a communication interface comprising a transmitter, a receiver, a transceiver and/or one or more antennas.

The methods according to the embodiments described herein for the radio network node 12 are respectively implemented by means of e.g. a computer program product 905 or a computer program, comprising instructions, i.e., software code portions, which, when executed on at least one processor, cause the at least one processor to carry out the actions described herein, as performed by the radio network node 12. The computer program product 905 may be stored on a computer-readable storage medium 906, e.g. a disc, a universal serial bus (USB) stick, or similar. The computer-readable storage medium 906, having stored thereon the computer program product 905, may comprise the instructions which, when executed on at least one processor, cause the at least one processor to carry out the actions described herein, as performed by the radio network node 12. In some embodiments, the computer-readable storage medium may be a non-transitory or a transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

Figure 10:
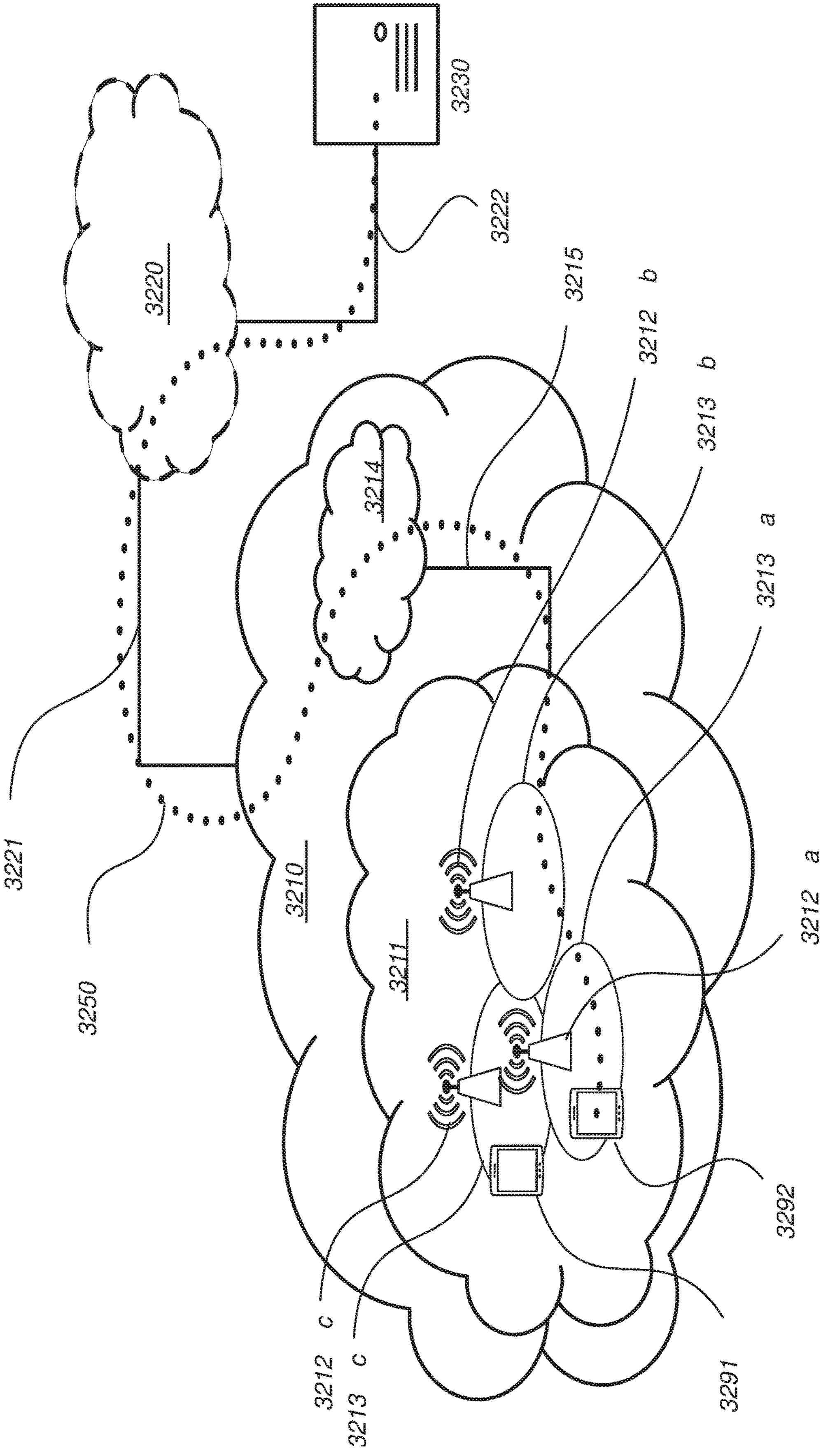
FIG. 10 is a schematic diagram depicting a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network nodes herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the wireless device 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
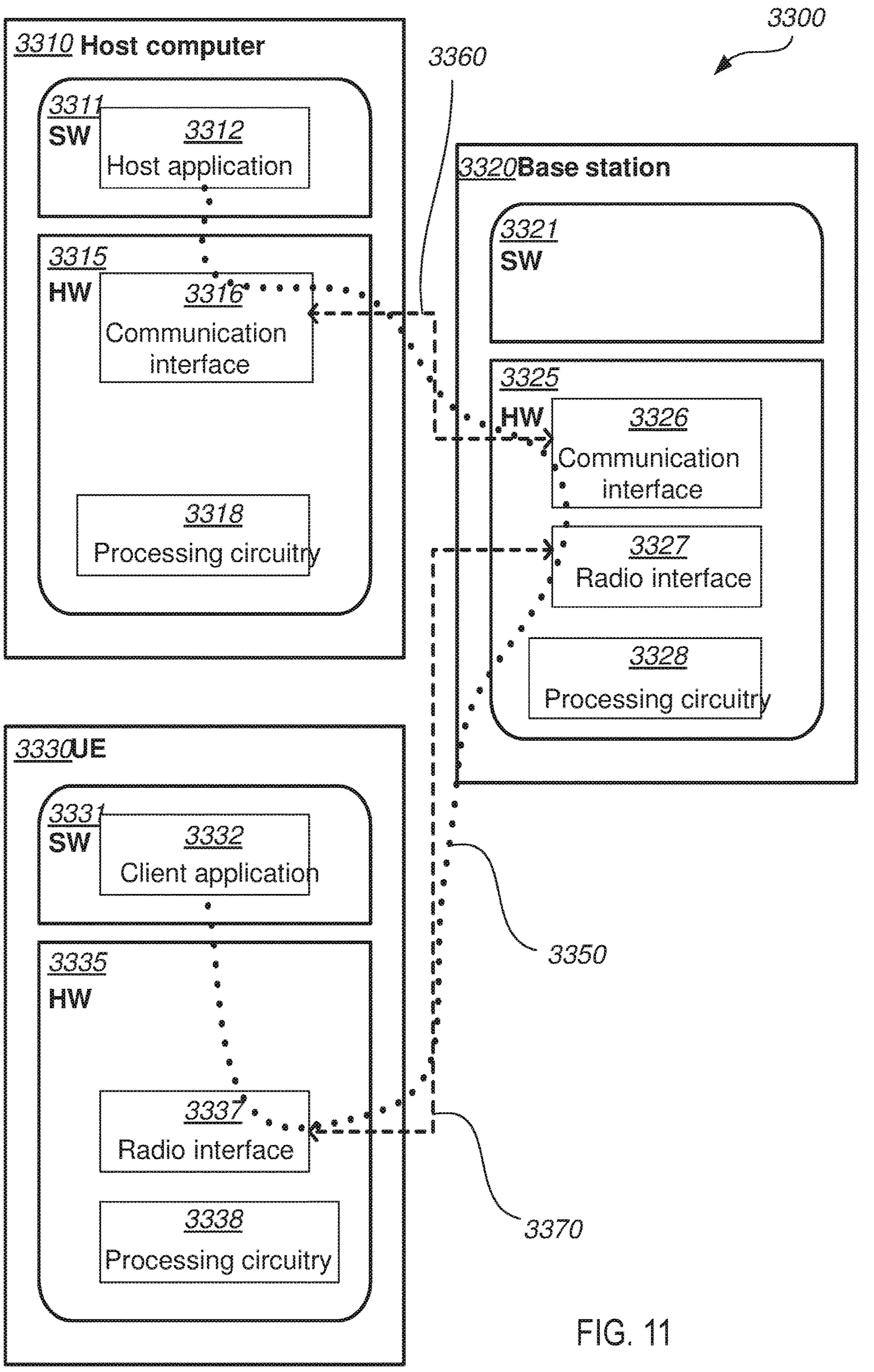
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212*a*, 3212*b*, 3212*c* and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments controlling the power provision may improve energy consumption on e.g. the radio network node and thereby provide benefits such as energy efficient, and also a more efficient usage of resources.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 12:
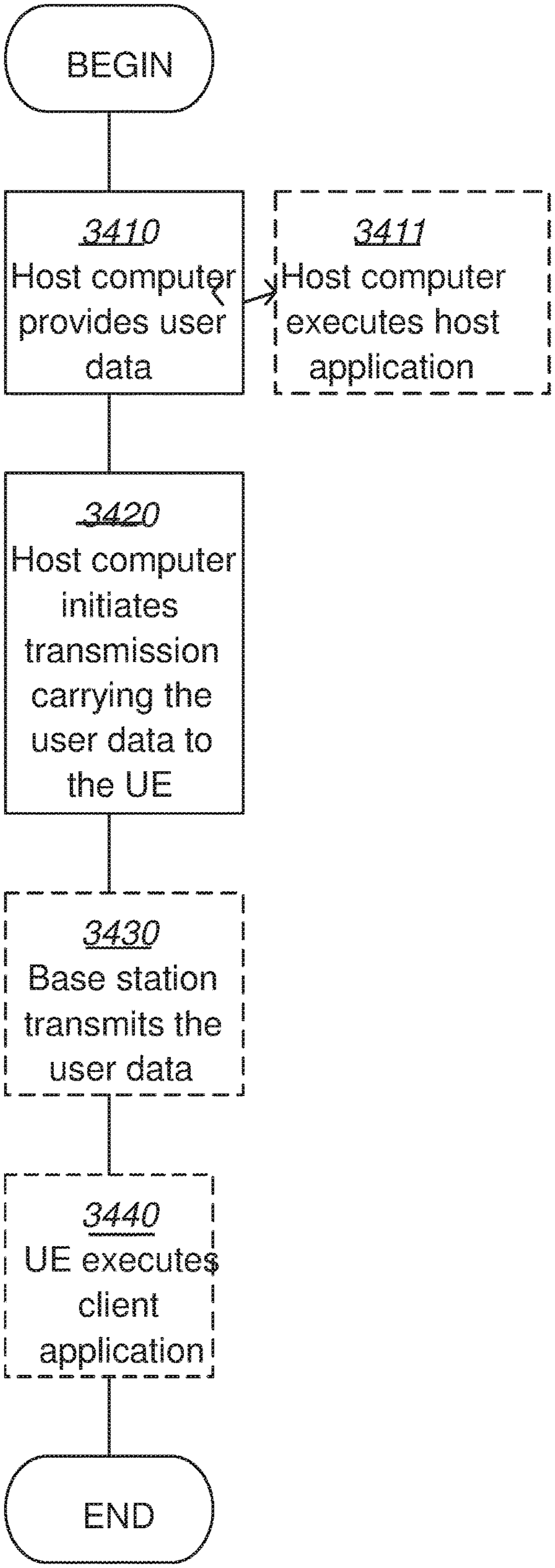
FIGS. 12 to 15 are flowcharts illustrating methods implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 13:
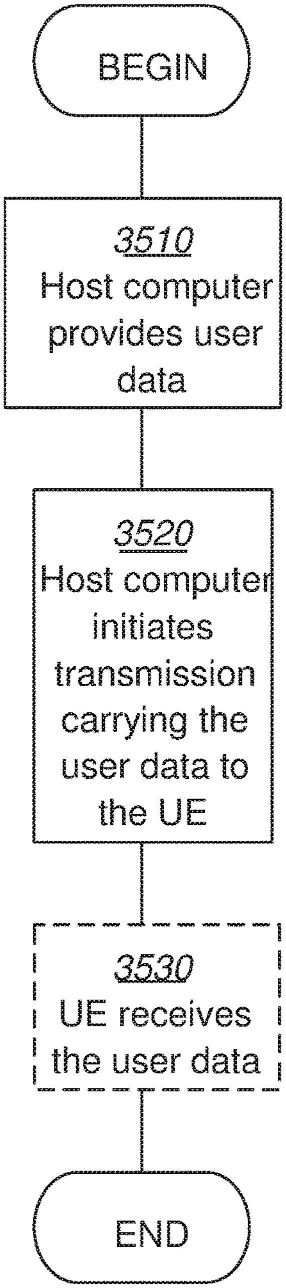

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 14:
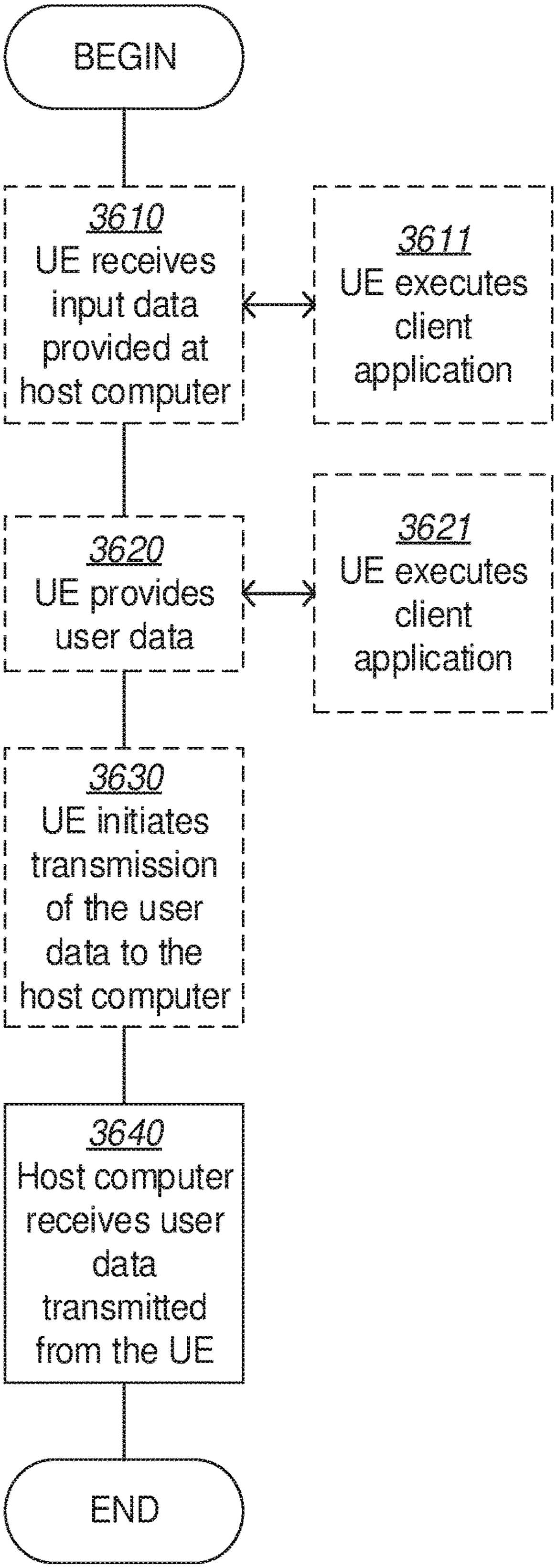

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 15:
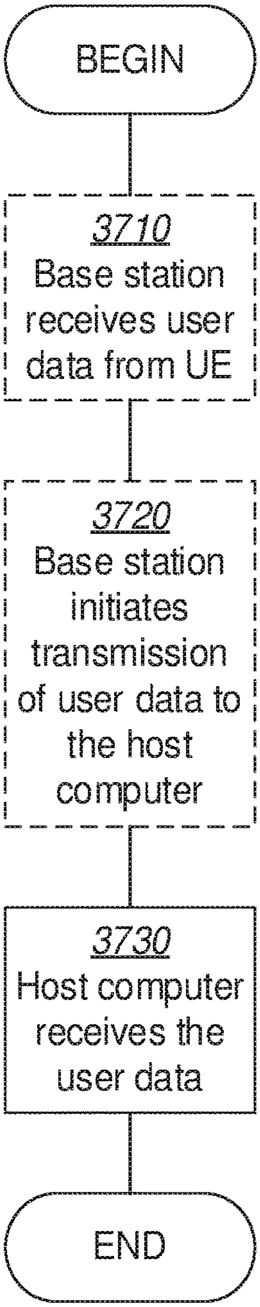

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio network node for controlling power provision of one or more transmission antenna elements associated with a user equipment, the method comprising:

obtaining an indication of a capability relating to an output power of the user equipment;

obtaining a state indication of the user equipment indicating an activity level of the user equipment; and controlling a power apparatus of the user equipment that controls power provision to the one or more transmission antenna elements of the user equipment by selectively activating and/or deactivating the one or more transmission antenna elements of the user equipment by transmitting a command to one or more voltage regulators to switch on or off power of a respective voltage regulator that provide power to the one or more transmission antenna elements, based on the state indication and/or the indication of capability.

2. The method according to claim 1, wherein controlling the power arrangement uses an output of a machine learning, ML, model.

3. The method according to claim 2, wherein one or more input parameters of the ML model comprises one or more of the following: current state indication; current indication of capability; previous state indication; current indication of capability; location of user equipments; time of day; and radio parameters.

4. The method according to claim 1, wherein the capability relating to an output power of the user equipment comprises power mode, power class, level of output power, and/or pattern of output power, of the user equipment.

5. The method according to claim 1, wherein the power arrangement comprises a voltage regulator.

6. The method according to claim 5, wherein the voltage regulator comprises a point of load converter, and/or an amplifier.

7. The method according to claim 1, wherein the radio network node comprises the power apparatus or is connected to the power apparatus.

8. A non-transitory computer-readable storage medium, having stored thereon a computer program product comprising instructions which, when executed on at least one processor, cause the at least one processor to:

obtain an indication of a capability relating to an output power of the user equipment;

obtain a state indication of the user equipment indicating an activity level of the user equipment; and control a power apparatus of the user equipment that controls power provision to one or more transmission antenna elements of the user equipment by selectively activating and/or deactivating the one or more transmission antenna elements of the user equipment by transmitting a command to one or more voltage regulators to switch on or off power of a respective voltage regulator that provide power to the one or more transmission antenna elements, based on the state indication and/or the indication of capability.

9. A radio network node for controlling power provision of one or more transmission antenna elements associated with a user equipment, wherein the radio network node comprises processing circuitry and a memory, said memory comprising instructions executable by said processing circuitry whereby said radio network node is configured to:

obtain an indication of a capability relating to an output power of the user equipment;

obtain a state indication of the user equipment indicating an activity level of the user equipment; and control a power apparatus of the user equipment that controls power provision to the one or more transmission antenna elements of the user equipment by selectively activating and/or deactivating the one or more transmission antenna elements of the user equipment by transmitting a command to one or more voltage regulators to switch on or off power of a respective voltage regulator that provide power to the one or more transmission antenna elements, based on the state indication and/or the indication of the capability.

10. The radio network node according to claim 9, wherein the radio network node is configured to control the power arrangement by transmitting a command to one or more voltage regulators to switch on or off power of respective voltage regulator.

11. The radio network node according to claim 9, wherein the radio network node is configured to use an output of a machine learning, ML, model to control the power arrangement.

12. The radio network node according to claim 11, wherein one or more input parameters of the ML model comprises one or more of the following: current state indication; current indication of capability; previous state indication; current indication of capability; location of user equipments; time of day; and radio parameters.

13. The radio network node according to claim 9, wherein the capability relating to an output power of the user equipment comprises power mode, power class, level of output power, and/or pattern of output power, of the user equipment.

14. The radio network node according to claim 9, wherein the power arrangement comprises a voltage regulator.

15. The radio network node according to claim 14, wherein the voltage regulator comprises a point of load converter, and/or an amplifier.

16. The radio network node according to claim 9, wherein the radio network node comprises the power apparatus or is connected to the power apparatus.

* * * * *